(12) United States Patent
McMurtry et al.

(10) Patent No.: US 8,001,859 B2
(45) Date of Patent: Aug. 23, 2011

(54) METHOD OF ERROR COMPENSATION IN A COORDINATE MEASURING MACHINE

(75) Inventors: David Roberts McMurtry, Dursley (GB); Geoff McFarland, Dursley (GB); Kenneth Cheng-Hoe Nai, Bristol (GB); Stephen James Trull, Wickwar (GB); Nicholas John Weston, Peebles (GB)

(73) Assignee: Renishaw PLC, Wotton-Under-Edge (GB)

( * ) Notice: Subject to any disclaimer, the term of this patent is extended or adjusted under 35 U.S.C. 154(b) by 0 days.

(21) Appl. No.: 12/457,958

(22) Filed: Jun. 26, 2009

(65) Prior Publication Data
US 2010/0005852 A1    Jan. 14, 2010

Related U.S. Application Data (63) Continuation of application No. 10/570,332, filed as application No. PCT/GB2004/004039 on Sep. 22, 2004, now Pat. No. 7,568,373.

(30) Foreign Application Priority Data

Sep. 22, 2003 (GB) .................................. 0322115.7

(51) Int. Cl.
*G01D 21/00* (2006.01)
(52) U.S. Cl. ...................................... 73/866.5
(58) Field of Classification Search ........................ None
See application file for complete search history.

(56) References Cited

U.S. PATENT DOCUMENTS

| | | | |
|---|---|---|---|
| 4,888,877 A | 12/1989 | Enderle et al. | |
| 4,991,304 A | 2/1991 | McMurtry | |
| 5,040,306 A | 8/1991 | McMurtry et al. | |
| 5,084,981 A | 2/1992 | McMurtry et al. | |
| 5,088,337 A | 2/1992 | Bennet | |
| 5,189,806 A | 3/1993 | McMurtry et al. | |
| 6,112,423 A | 9/2000 | Sheehan | |
| 6,434,846 B1 | 8/2002 | McMurtry et al. | |
| 6,701,267 B2 | 3/2004 | Noda et al. | |
| 6,772,619 B2 | 8/2004 | Nashiki et al. | |
| 6,909,983 B2 | 6/2005 | Sutherland | |
| 2002/0104227 A1 | 8/2002 | Trull et al. | |
| 2004/0118000 A1 | 6/2004 | Roth et al. | |
| 2004/0148792 A1 | 8/2004 | Zanier et al. | |
| 2004/0149057 A1 | 8/2004 | Jordil et al. | |
| 2004/0154177 A1 | 8/2004 | Jordil et al. | |
| 2004/0154179 A1 | 8/2004 | Rouge et al. | |

FOREIGN PATENT DOCUMENTS

| | | |
|---|---|---|
| DE | 196 07 680 A1 | 9/1996 |
| EP | 0 392 660 A2 | 10/1990 |
| EP | 1 443 302 A2 | 8/2004 |
| EP | 1 446 636 B1 | 2/2005 |
| GB | 2 298 488 A | 9/1996 |

*Primary Examiner* — Robert R Raevis (74) *Attorney, Agent, or Firm* — Oliff & Berridge PLC (57) ABSTRACT

A method of calibrating an articulating probe head comprising the steps of measuring an artefact of known dimensions with the workpiece sensing probe mounted on the articulating probe head, in which the articulating probe head is unlocked. An error functional map is generated corresponding to the difference between the measured and known dimensions of the artefact. Subsequent workpieces are measured with the articulating probe head unlocked and the corresponding correction applied. The true dimensions of the artefact may be determined by measuring it with a probe mounted on an articulating probe head in which the axes of the articulating probe head are locked. A mechanical lock is provided to lock the axes of the articulating probe head.

14 Claims, 13 Drawing Sheets

METHOD OF ERROR COMPENSATION IN A COORDINATE MEASURING MACHINE

This is a Continuation of application Ser. No. 10/570,332 filed Mar. 2, 2006, which is a National Stage of PCT/GB2004/004039 filed Sep. 22, 2004, and claims priority to GB 0322115.7 filed Sep. 22, 2003. The disclosure of the prior applications are hereby incorporated by reference herein in their entirety.

This invention relates to the measurement of the dimensions of workpieces using an articulating probe head mounted on coordinate positioning apparatus. Coordinate positioning apparatus includes for example coordinate measuring machines (CMM), machine tools, manual coordinate measuring arms and inspection robots.

It is common practice after workpieces have been produced, to inspect them on a coordinate measuring machine (CMM) having a quill onto which a probe is mounted which can be driven in three orthogonal directions X,Y,Z within a working volume of the machine.

The CMM may be error mapped, for example by using laser interferometers, which enables it to measure a part accurately at slow speeds.

When measuring a workpiece at fast speeds, accelerations of the machine cause dynamic errors. Our previous U.S. Pat. No. 4,991,304 discloses a method of correcting for these dynamic errors. In this method a first workpiece is put on the coordinate measuring machine table and a set of points on the surface of the workpiece are measured at a slow speed to allow accurate readings to be taken. Measurement of the first workpiece is then repeated at a fast speed. The difference between the slow speed readings and the fast speed readings is calculated and stored. The stored error value for each measured point takes into account the dynamic deflections of the machine structure at the faster speed.

The next workpiece to be measured is set up on the CMM table and readings are taken at the fast speed. At this speed the readings are inaccurate but repeatable. Each fast reading is adjusted by adding the corresponding stored error value and thus compensating for errors induced by fast reading. This method has the advantage that a whole series of nominally identical workpieces can be measured at fast speed by making a dynamic error map from only one workpiece.

Use of this method allows workpieces to be measured using the CMM at a faster speed but has an upper limit above which it becomes unsatisfactory. This may be due to the CMM becoming inconsistent and/or unstable at high accelerations or the machine being unable to achieve the acceleration demanded.

The limitations described above can be overcome by using a high bandwidth apparatus which is mounted on the coordinate measuring machine. Such a high bandwidth apparatus is disclosed in U.S. Pat. No. 5,189,806 which describes an articulating probe head capable of orientating a probe with two degrees of freedom to enable the probe to be used in an operation for scanning the surface of workpieces. In general such a probe head includes two rotary drive mechanisms which enable a probe to be orientated about two substantially orthogonal rotary axes.

Such an articulating probe head enables fast repeatable scanning. However, use of this articulating probe head has the disadvantage that it is time consuming to calibrate. Furthermore, the measurement system of the articulating probe head mounted on a conventional coordinate measuring machine is a five-axis system which makes calibration much more complicated.

A first aspect of the present invention provides a method of calibrating an articulating probe head, the articulating probe head being mounted on an arm of a coordinate positioning apparatus, in which a surface sensing device mounted on the articulating probe head is moved into a position-sensing relationship with an artefact and a position reading taken, the method comprising the following steps, in any suitable order:

a) measuring an artefact whose true measurements have been determined wherein there is relative movement between the surface sensing device and the arm of the coordinate positioning apparatus;

b) generating an error function or map corresponding to the difference between the measurements obtained in step a and the true measurement of the artefact;

c) measuring subsequent workpieces wherein there is relative movement between the surface sensing device and the arm of the coordinate measuring apparatus; and d) correcting measurements of subsequent workpieces obtained in step c using the error function or map generated in step b.

The true measurements of the artefact may be determined by measuring the artefact, wherein there is no relative movement between the surface sensing device and the arm of the coordinate positioning apparatus. Preferably this is done at a slow speed to remove dynamic errors.

The true measurement of the artefact may be determined by using a calibrated artefact.

Preferably the calibrated artefact comprises at least one circular profile.

The surface sensing device may comprise for example a workpiece sensing probe or a stylus.

The artefact may comprise a workpiece in the series of workpieces. Alternatively the artefact may have features the size and location of which approximate the workpiece. The artefact may have the same surface finish as the workpiece or alternatively may mimic the surface finish of the workpiece.

In step a) the arm of the coordinate measuring apparatus may be stationary. Alternatively the arm of the coordinate measuring apparatus may be moving at a constant velocity. This eliminates dynamic forces from the coordinate measuring apparatus.

The measurements taken may be discrete measurements (i.e. using a touch trigger probe) or continuous measurements (i.e. using a scanning probe).

The surface sensing device may be a contact probe, such an analogue (scanning) probe or a touch trigger probe. Alternatively the surface sensing device may be a non-contact probe, such as a capacitance, inductive or optical probe.

A second aspect of the invention provides an articulating probe head comprising a first mount for mounting on a support and a second mount onto which a surface sensing device may be mounted, the second mount being rotatable relative to the first mount about one or more axis, characterised in that the articulated probe head is provided with at least one mechanical brake to lock the position of the second mount relative to the first mount about at least one axis; and whereby at least one position measuring device is provided to determine the position of the second mount relative to the first mount about said at least one axis.

Preferably the articulating probe head includes a rotary member rotatable about at least one axis, and wherein the lock has a lock member which moves between the first and second positions, in its first position it engages with the rotary member to lock the rotary member in position and in its second position it disengages the rotary member, allowing the rotary member to rotate.

The rotary member may comprise a drive belt or a driven wheel.

The rotary member may be provided with a tooth profile and wherein a toothed lock assembly is provided on the lock, such that in the first position the teeth of the lock assembly and the rotary member interlock.

The lock may be provided with an actuator to move the lock member between its first and second positions.

The point of contact between the actuator and the lock member may be separated transversely from the point of contact between the lock member and the rotary member. The lock member may comprise a lever assembly pivotable about a pivot point and wherein the point of contact between the lock member and the rotary member is located between the pivot joint and the point of contact between the actuator and the lock member. The lock member may comprise a lever assembly. Biasing means may be provided to bias the lock member against the rotary member when the lock member is in its first position.

Preferred embodiments of the invention will now be described by way of example with reference to the accompanying drawings wherein.

Figure 1:
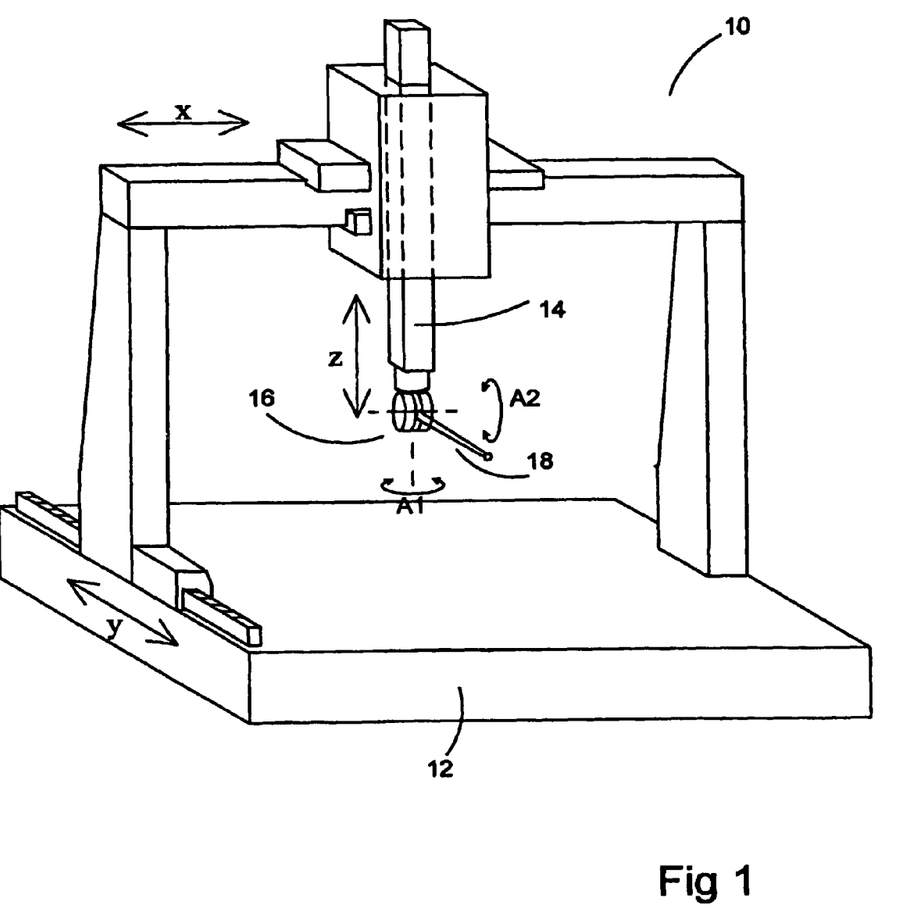
FIG. 1 is a perspective view of a coordinate measuring machine (CMM) provided with an articulating probe head.

FIG. 1 illustrates an articulating probe head mounted on a coordinate measuring machine. The coordinate measuring machine 10 comprises a table 12 on which a workpiece may be placed and an arm 14 movable in X, Y and Z relative to the table 12. An articulating probe head 16 is mounted on the arm 14 of the CMM. The articulating probe head 16 allows a workpiece-measuring probe 18 mounted on it to be rotated about two substantially orthogonal axes A1 and A2.

The machine arm 14 may therefore be moved in X, Y and Z directions under the action of X, Y and Z drives (not shown) of the coordinate measuring machine. X, Y and Z scales (not shown) show the instantaneous coordinates of the position of the arm 14. Rotary drive means in the articulated probe head (not shown) enable movement of the probe about the two rotary axes A1 and A2. This movement is measured by rotary scales (not shown) inside the articulating probe head 16. Signals from the probe 18 indicating the deflection of the probe stylus are combined with the readings from the X, Y and Z scales of the CMM and the rotary scales of the articulating probe head to calculate the position of the stylus tip and thus the surface of the workpiece.

Figure 2:
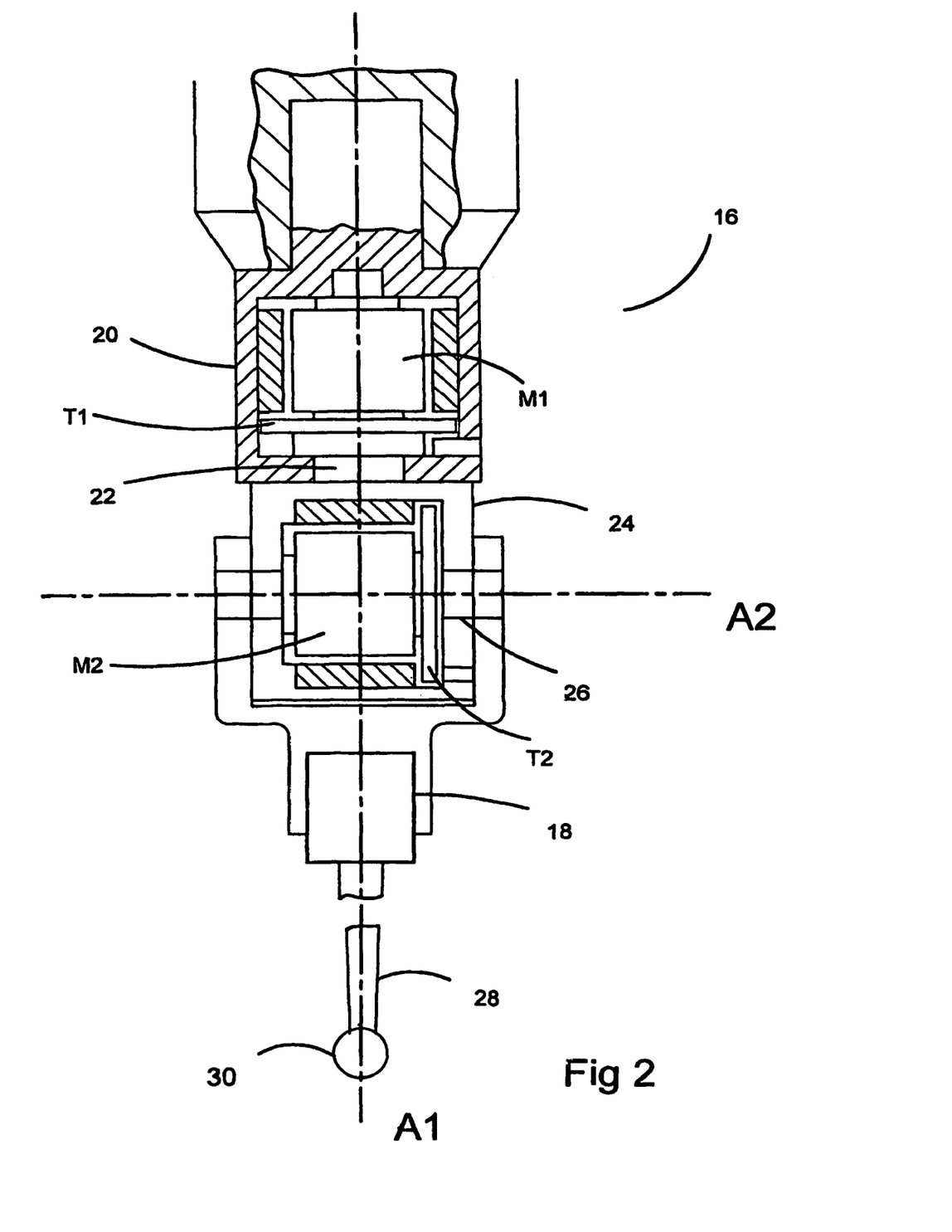
FIG. 2 illustrates a cross-sectional view of the articulating probe head.

As illustrated in FIG. 2, the articulating probe head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by motor M2 relative to the housing 24 about an axis A2 perpendicular to the axis A1.

A probe 18 with a stylus 28 having a workpiece-contacting tip 30 is mounted onto the articulating probe head 16. The arrangement is such that the motors M1, M2 of the head can position the workpiece-contacting tip 30 angularly about the axes A1 or A2 and the motors of the CMM (not shown) can position the articulating probe head 16 linearly anywhere within the three-dimensional coordinate framework of the CMM to bring the stylus tip 30 into a predetermined relationship with the surface being scanned.

Linear position transducers (not shown) are provided on the CMM for measuring linear displacement of the articulating probe head 16 and angular position transducers T1 and T2 are produced in the articulating probe head 16 for measuring angular displacement of the stylus 38 about the respective axes A1 and A2.

Figure 3:
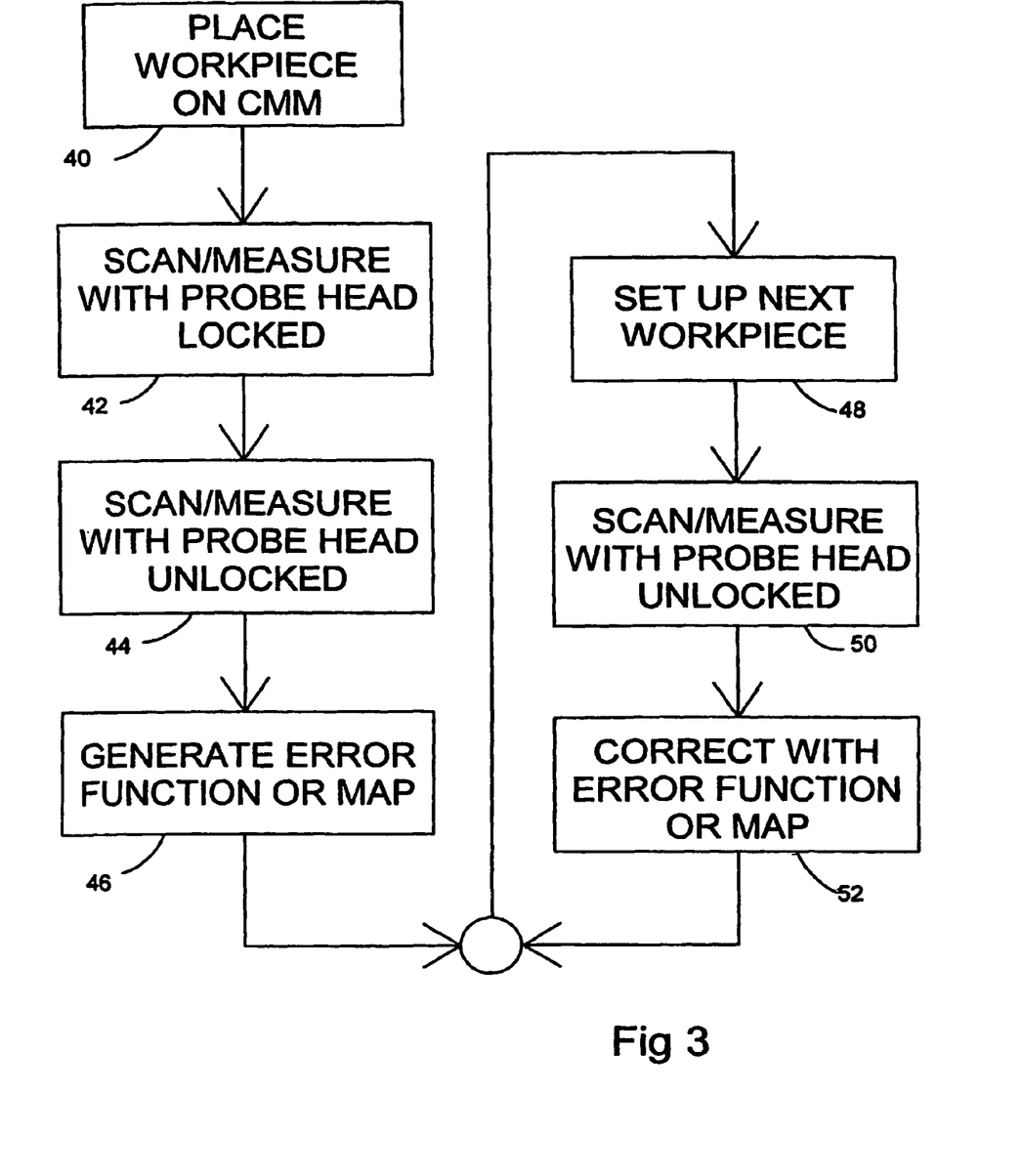
FIG. 3 is a flow chart of the method.

Referring to FIG. 3 the following procedure is used in the present inspection method. A workpiece from the series of workpieces to be measured is placed on the table 12 of the coordinate measuring machine 40. Alternatively an artefact could be used which approximates the workpiece, in particular having features the size and/or location of which match the features of the workpiece.

The rotational axes of the articulating probe head are locked, or held stationary such that the probe 18 is not able to move about the rotation axes A1 and A2. Thus the system is effectively a probe mounted on a coordinate measuring machine. With the articulating probe head so locked, the workpiece or artefact is scanned or measured 42.

Figures 4, 5:
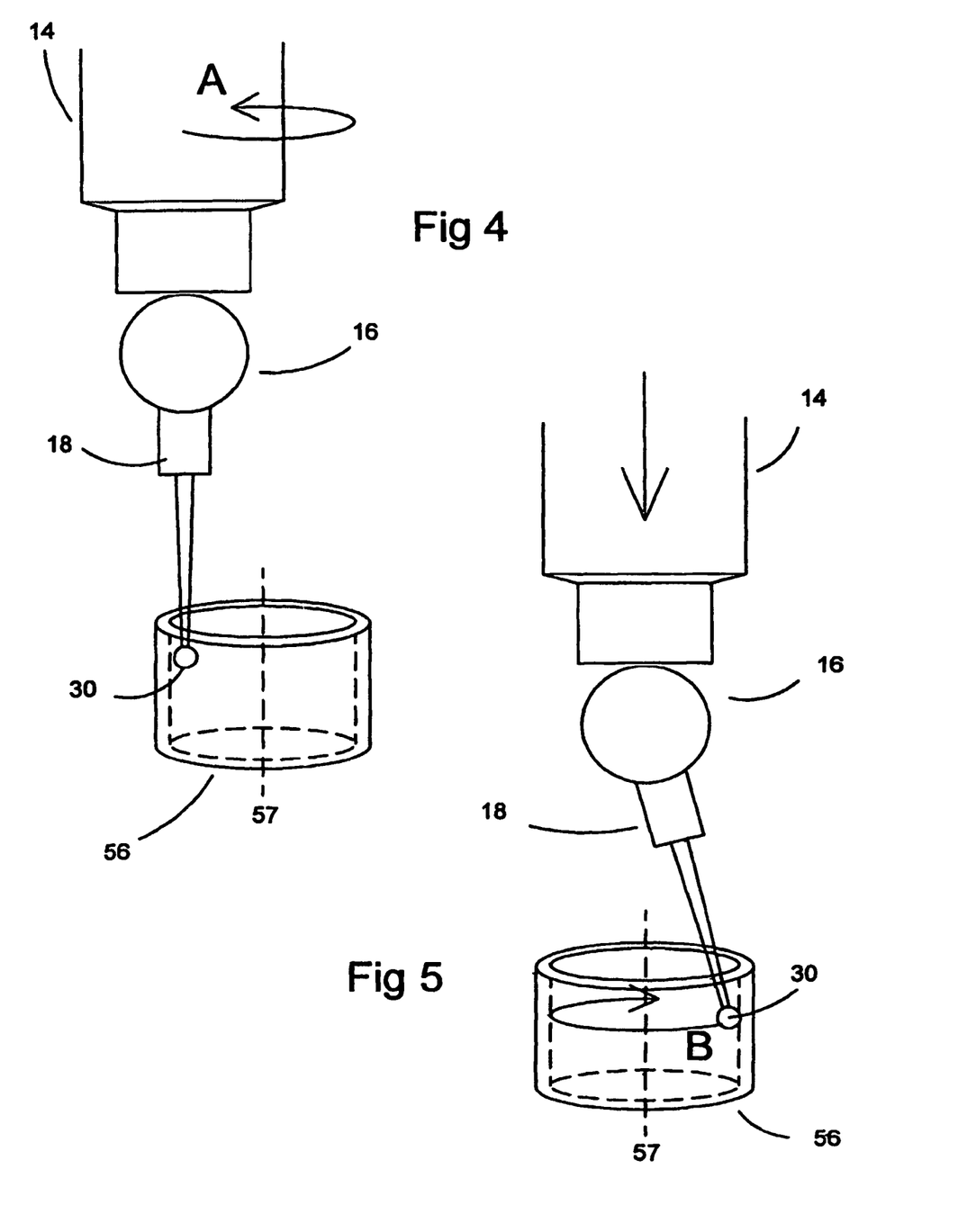
FIG. 4 illustrates a bore being measured with the articulating probe head locked.
FIG. 5 illustrates a bore being measured with the articulating probe head unlocked.

FIG. 4 illustrates a bore 56 being scanned with the articulating probe head 16 locked. In this case the arm 14 of the CMM must move as shown by arrow A to allow the workpiece-contacting tip 30 of the probe 18 to measure the internal surface of the bore.

In the next step of the method, the articulating probe head 16 is unlocked so that the probe 18 may move about the rotary axes A1 and A2. The workpiece is then scanned or measured with the articulated probe head unlocked 44.

FIG. 5 illustrates a bore 56 being scanned with the articulating probe 16 unlocked. The machine arm 14 may be positioned such that it is aligned with the axis of symmetry 57 of the bore 56 and held stationary whilst the probe 18 is moved about the rotational axes of the articulating probe head 16. Alternatively the arm of the CMM may move at constant velocity along the axis of symmetry 57 of the bore 56 as the probe 18 is rotated about the rotation axes of the articulating probe head 18. In this case the internal surface of the bore is scanned in a spiral profile. In both cases i.e. when the arm 14 is stationary or moved at constant velocity, no dynamic forces are applied to the machine.

In a next step the measurement data obtained during the scan with the articulating probe head locked is compared with the measurement data obtained from the scan with the articulating probe head unlocked. This is used to generate an error function or map 46. This error function or map allows the errors caused by the articulating probe head at each point on the surface of the workpiece to be determined.

Subsequent workpieces in the series of workpieces are set up on the coordinate measuring machine 48.

Preferably automatic means (not shown) place each of the succession of substantially identical workpieces for a production run in at least nominally the same position and orientation on the CMM table. One of the subsequent workpieces is scanned with the articulating probe head unlocked. The measurement data obtained during this scan is corrected using the error function or map 52 created previously.

For best results, substantially the same measurement path is used for measuring the subsequent workpiece (50, FIG. 3) as for the initial measurement with the probe head unlocked (44, FIG. 3).

This method takes advantage of the accuracy of the CMM and the repeatability of the articulating probe head to enable fast and accurate measurements of workpieces to be taken without the requirement for calibrating the articulating probe head.

This method corrects for geometric errors in the articulating head. It is possible to use this method to also correct for dynamic errors which may for example be caused by bending in the articulated head or twisting of the quill of the CMM. To correct for dynamic errors, the workpiece is scanned at a slow speed in step 42 to obtain measurement data with no dynamic errors. The workpiece is then scanned at a fast speed in step 44 so that the error map or function generated in step 46 includes both geometric errors and the dynamic errors caused by scanning at a fast speed. The subsequent measurements in step 50 are measured at a fast speed. The dynamic errors created during this scan are corrected by the error map or function in step 52.

However, if the articulating head has a good mechanical design, there will be negligible dynamic errors and thus the workpieces can be measured at any speed in each case.

Although the above description is directed at the use of scanning probes, it is also suitable for taking measurements with a touch trigger probe, in which discrete measurements are taken at points on the surface of the workpiece. Furthermore, the method is also suitable for use with a non-contact probe, for example a capacitive, inductive or optical probe. The rotational axes of the articulating probe head may be locked by various means. For example, the articulated probe head may be held stationary on the servo motors, or a separate locking device may be used.

Figure 6:
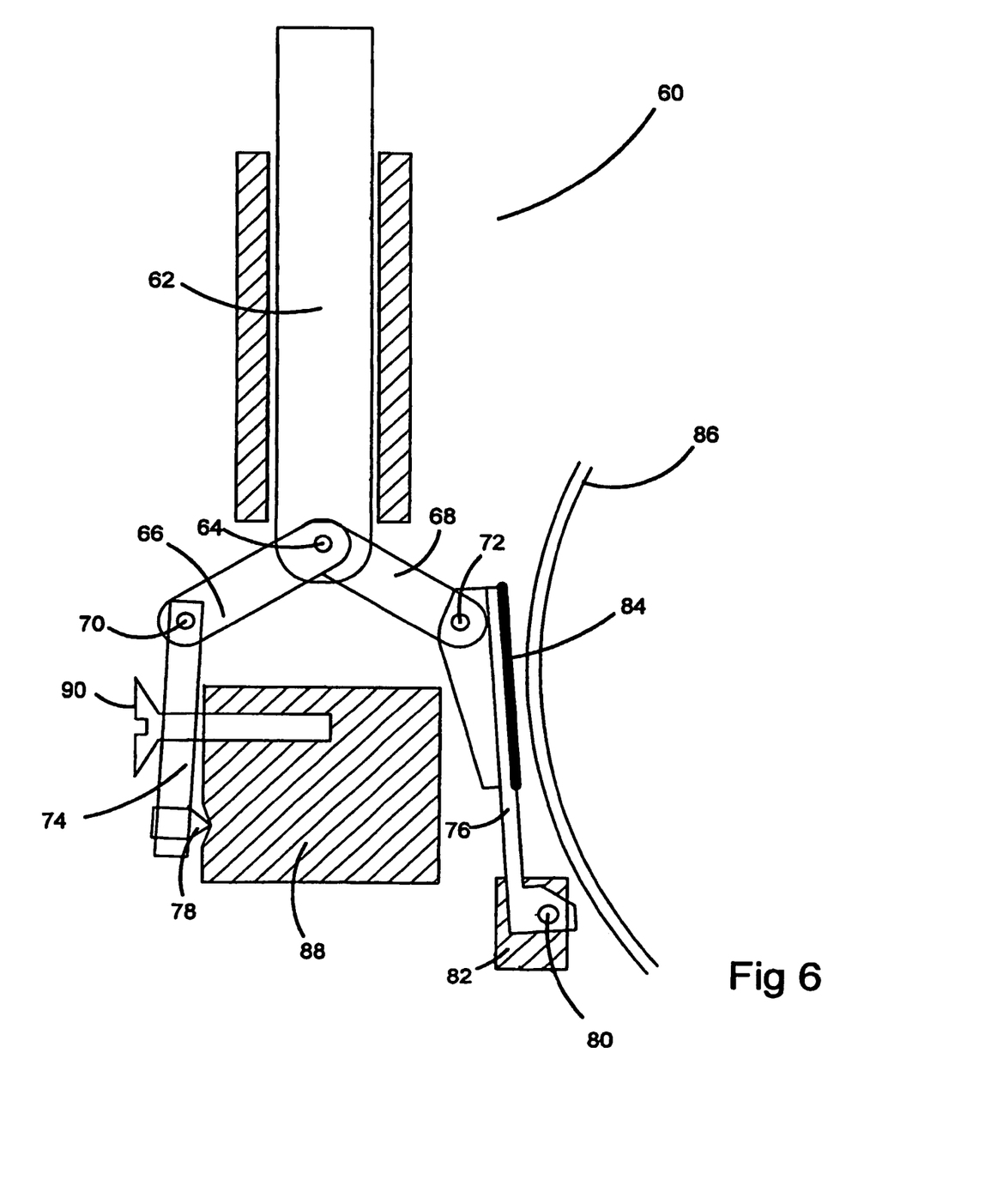
FIG. 6 illustrates a mechanical brake in its upper position.
Figure 7:
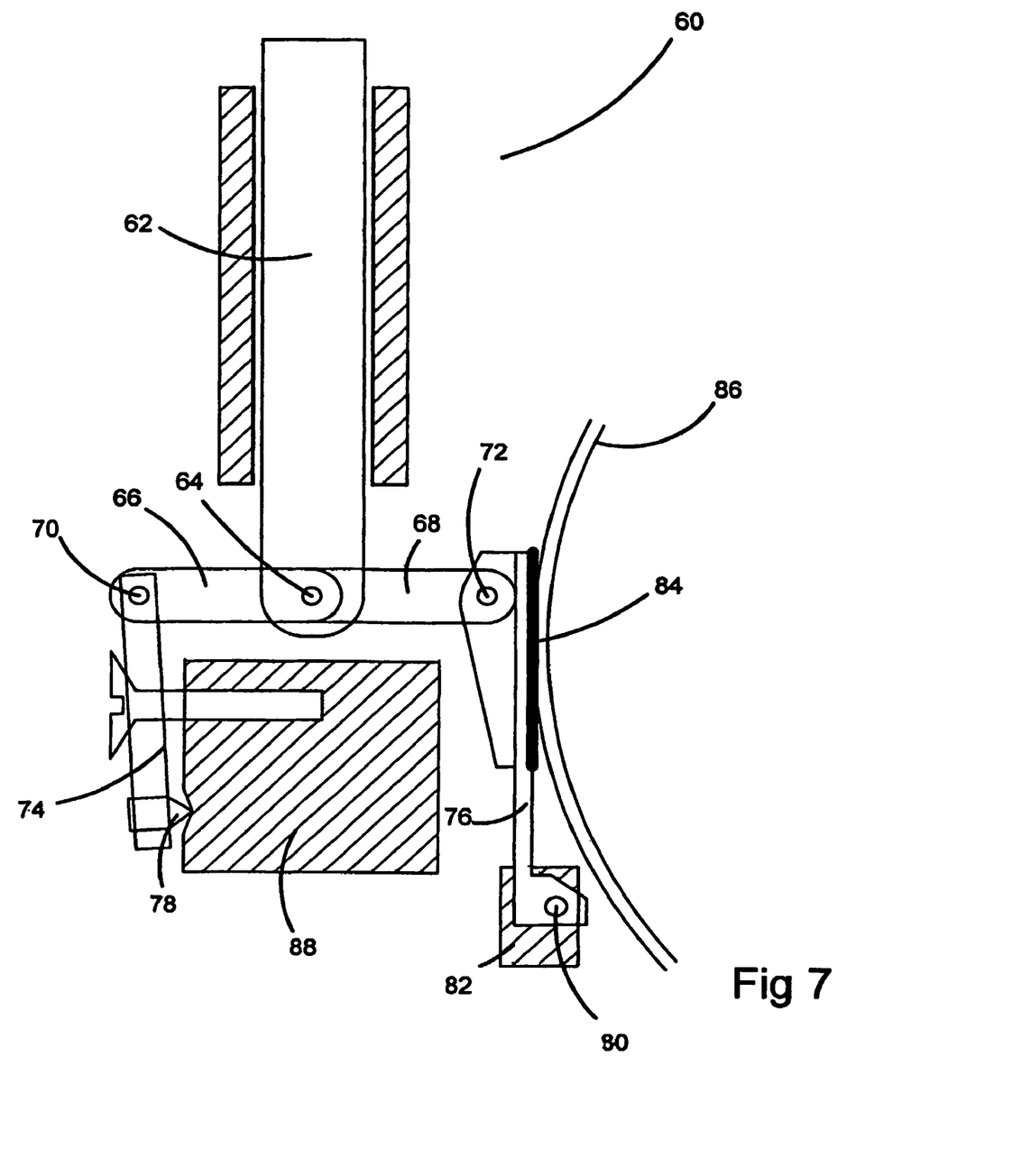
FIG. 7 illustrates the mechanical brake of FIG. 6 in its lower position.

FIGS. 6 and 7 illustrate a mechanical brake used to lock the rotational axes of the articulating probe head. The brake 60 comprises a brake pad 84 which may be pushed onto a pulley belt 86 of a driven wheel to thereby lock movement. The brake 84 may be made of rubber, which has a high coefficient of friction. The brake pad is pushed against the pulley belt by a lever mechanism which will be described in more detail below. A pin 62 is movable between upper and lower positions by the action of a switching solenoid. FIG. 6 shows the pin 62 in its upper position and FIG. 7 shows the pin 62 in its lower position. The lower end of the pin is connected to first and second arms 66,68 by a pivot 64. The first arm 66 is connected to the pin 62 at one end by the pivot 64 and to a third arm 74 at its second end by another pivot 70. The third arm 74 is provided with a pivot 78 at one end, about which it may rotate relative to a fixed surface 88.

The second arm 68 is connected to the pin 62 at one end by the pivot 62 and to a fourth arm 76 at its second end by another pivot 72. The fourth arm 76 is attached to a fixed surface 82 by a pivot 80 at its other end. The fourth arm is provided with a brake pad 84 on a surface adjacent the pulley belt 86.

FIG. 6 shows the pin 62 in its upper position with the brake pad 84 in its disengaged position. A current may be passed through the switching solenoid to push the pin 62 into its lower position shown in FIG. 7. This downward movement of pin 62 and its pivot 64 causes first and second arms 66,68 to swivel about pivot 64 and move outwards becoming closer to a horizontal position. This movement of the first and second arms 66,68 causes third and fourth arms 74,76 to rotate about their respective pivots 78,80 so that the ends adjacent the first and second arms 66,68 are pushed away from the pin 62. The brake pad 84 is thereby pushed against the pulley belt 86 to act as a brake. Screw 90 located in the fixed block 88 acts as a stop to define the maximum movement of the third arm 74 and thus also the fourth arm 76.

Figure 11:
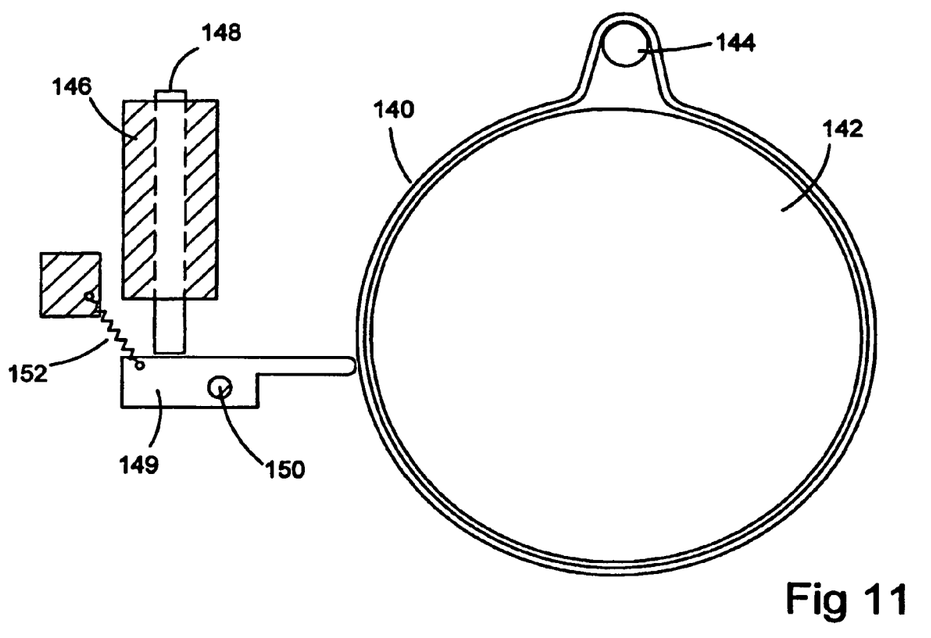
FIGS. 11 and 12 are side views of a second embodiment of a mechanical brake in its locked and unlocked positions respectively.
Figure 12:
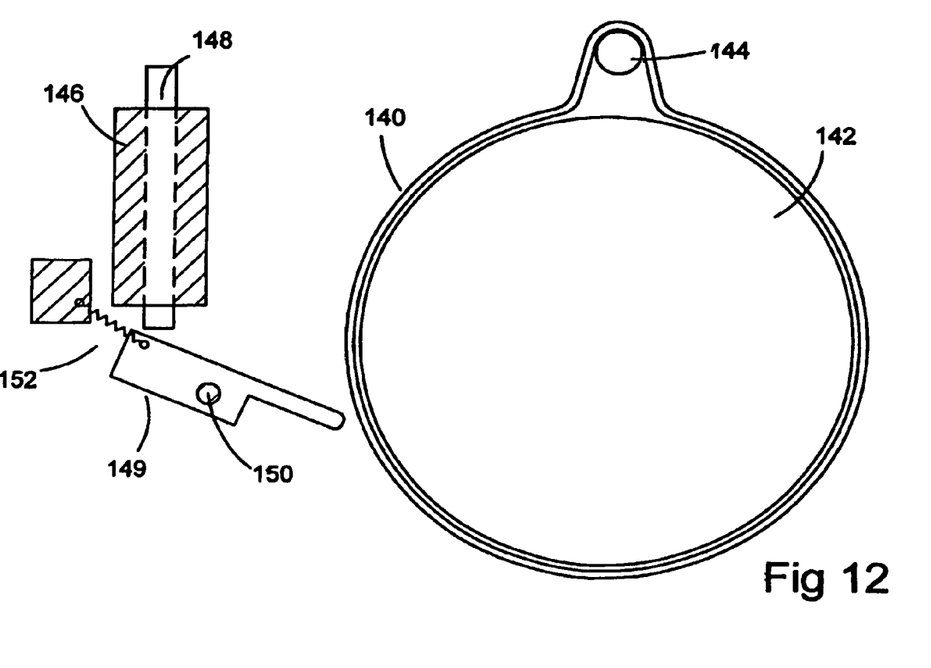

FIGS. 11 and 12 illustrate a second embodiment of the mechanical brake. FIG. 11 illustrates a drive wheel 144 which drives a driven wheel 142 via a drive belt 140. The brake is a pinch brake in which a brake shoe is pushed against the drive belt in the locked position and held away from the drive belt in the unlocked position. The drive shoe 149 rotates between its locked position illustrated in FIG. 11 and its unlocked position illustrated in FIG. 12 about a pivot 150. The pivot 150 includes adjustment means such as a cam which enables fine adjustment of the position of the brake shoe 149.

The position of the brake shoe is actuated by a solenoid 146. In the locked position illustrated in FIG. 11 the solenoid 146 pushes a pin 148 against the brake shoe 149, causing it to rotate about the pivot 150 into its locked position. In the unlocked position the solenoid 146 pushes the pin 148 upwards out of contact with the brake shoe 149 and a return spring 152 biases the brake shoe into its unlocked position.

Figure 13:
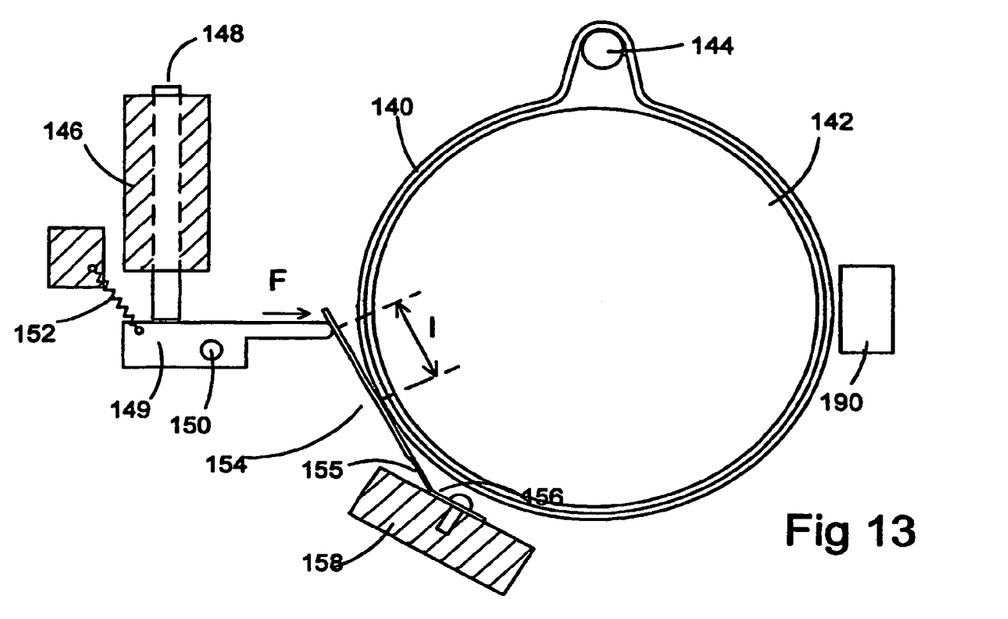
FIGS. 13 and 14 are side views of a third embodiment of a mechanical brake in its locked and unlocked positions respectively.
Figure 14:
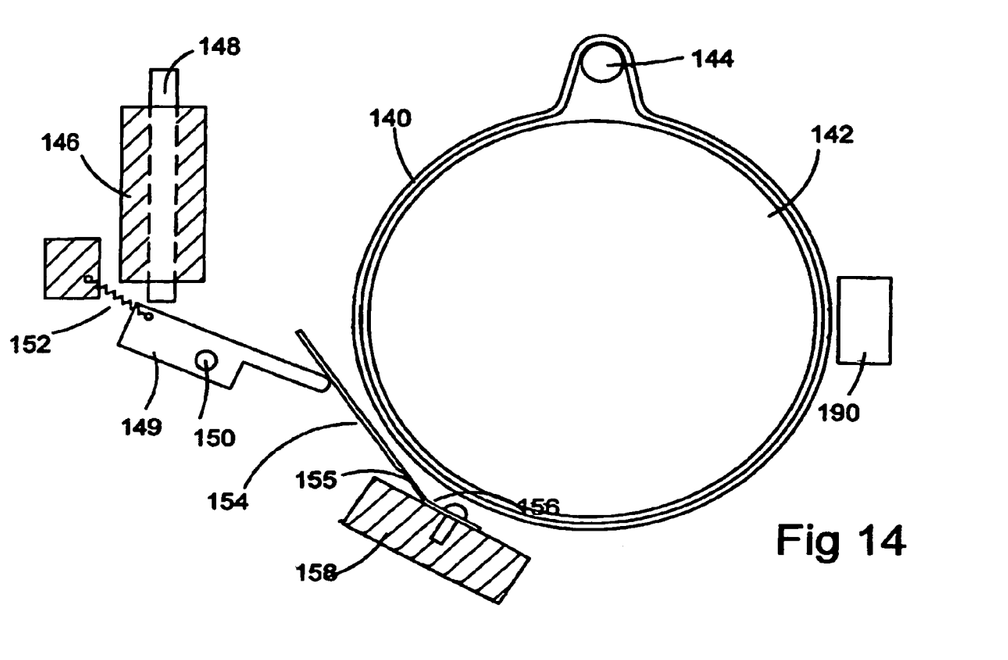

FIGS. 13 and 14 illustrate a third embodiment of the invention. The embodiment is similar to that shown in FIGS. 11 and 12 and similar features use the same reference marks.

A lever assembly 154 is provided which extends from a fixed surface 158 to lie adjacent the drive wheel 140. A flexure 156 allows pivoting of the lever assembly and biases the lever away from the drive belt.

When the brake is in its locked position as illustrated in FIG. 13, the brake shoe 149 pushes against the lever 154 which in turn presses against the drive belt 140. When the brake is in its unlocked position, the brake shoe 149 is biased towards its rest position by a return spring 152 and the lever assembly 154 is biased to its rest position by the flexure 156. The lever assembly acts as a separating member and separates the point of contact between the lever and the drive belt from the point of contact between the brake shoe and the lever. The lever assembly prevents the brake from overlooking or jamming in either direction of rotation of the driven member, which may be caused by variation in the thickness of the drive belt and the roundness of the driven wheel.

A weakened section 155 of the lever assembly 154 enables it to act as a spring lever. Thus when the brake shoe 149 creates a force F against the lever assembly, the lever is able to bend over length L and thereby accommodate any error in the thickness of the drive belt or roundness of the driven wheel.

The brake systems described in FIGS. 6 and 7 and 11-14 are non-incremental and thus allow the driven wheel to be locked in any position.

Figure 15:
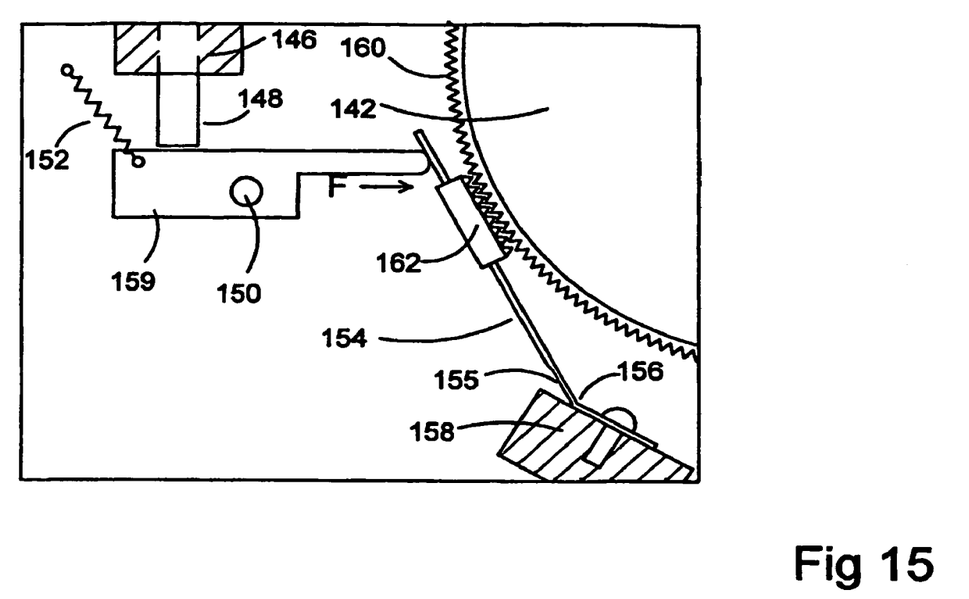
FIGS. 15 and 16 are side views of a fourth embodiment of a mechanical brake in its locked and unlocked positions respectively.
Figure 16:
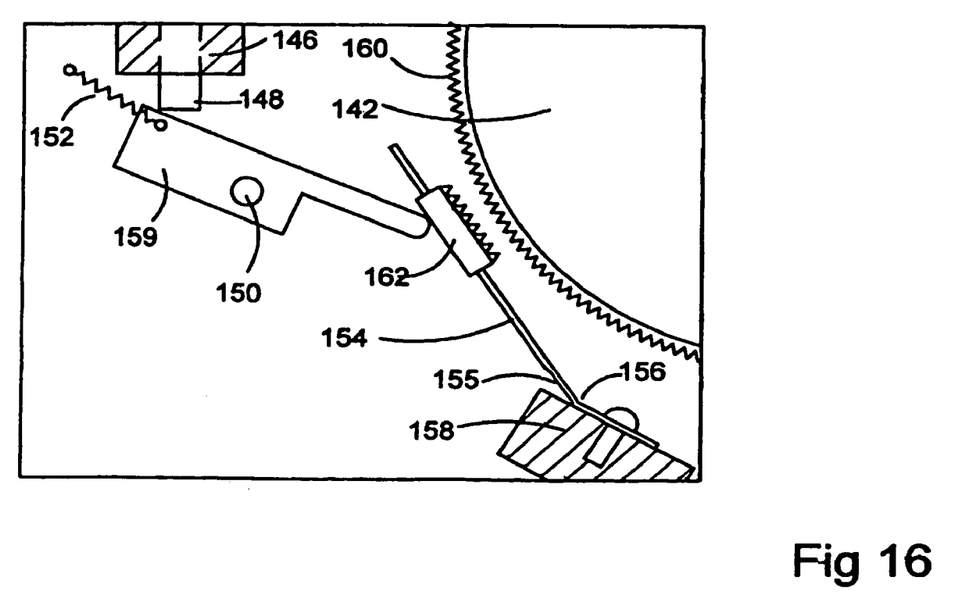

FIGS. 15 and 16 illustrate a fourth embodiment of the mechanical brake. This embodiment has some components in common with FIGS. 13 and 14 and similar features use the same reference numerals.

In FIGS. 15 and 16, the brake acts on the drive wheel 142 rather than a drive belt, which is located on one side of the drive wheel. The driven wheel 142 is provided with a tooth surface 160 on its circumference. This may be provided for example by a ring with an outer surface having a tooth profile. A complementary tooth assembly 162 is provided on the lever assembly 154. Thus in the locked position illustrated in FIG. 15 the teeth in the toothed surface 160 of the driven wheel and the tooth assembly 162 of the lever engage to lock the drive wheel 142 in position. As this embodiment has interlocking teeth, the brake will hold the drive wheel in incremental positions, for example of 1°. This embodiment has the advantage that it is effective even when there are errors in the thickness of the belt and/or the roundness of the wheel. Once the teeth have engaged, the flexibility of the lever assembly enables the brake shoe to exert more force F to bias the lever into the brake position, ensuring the brake remains on.

In any of these embodiments, a rotary encoder system may also be provided, for example it may be located on the drive wheel. As illustrated in FIGS. 13 and 14, this may comprise a rotary scale ring mounted on the driven wheel and a readhead located on a relatively fixed surface adjacent the wheel. Any slight movement in the brake position can be read by the encoder and a correction applied to the measurement data.

Figure 17:
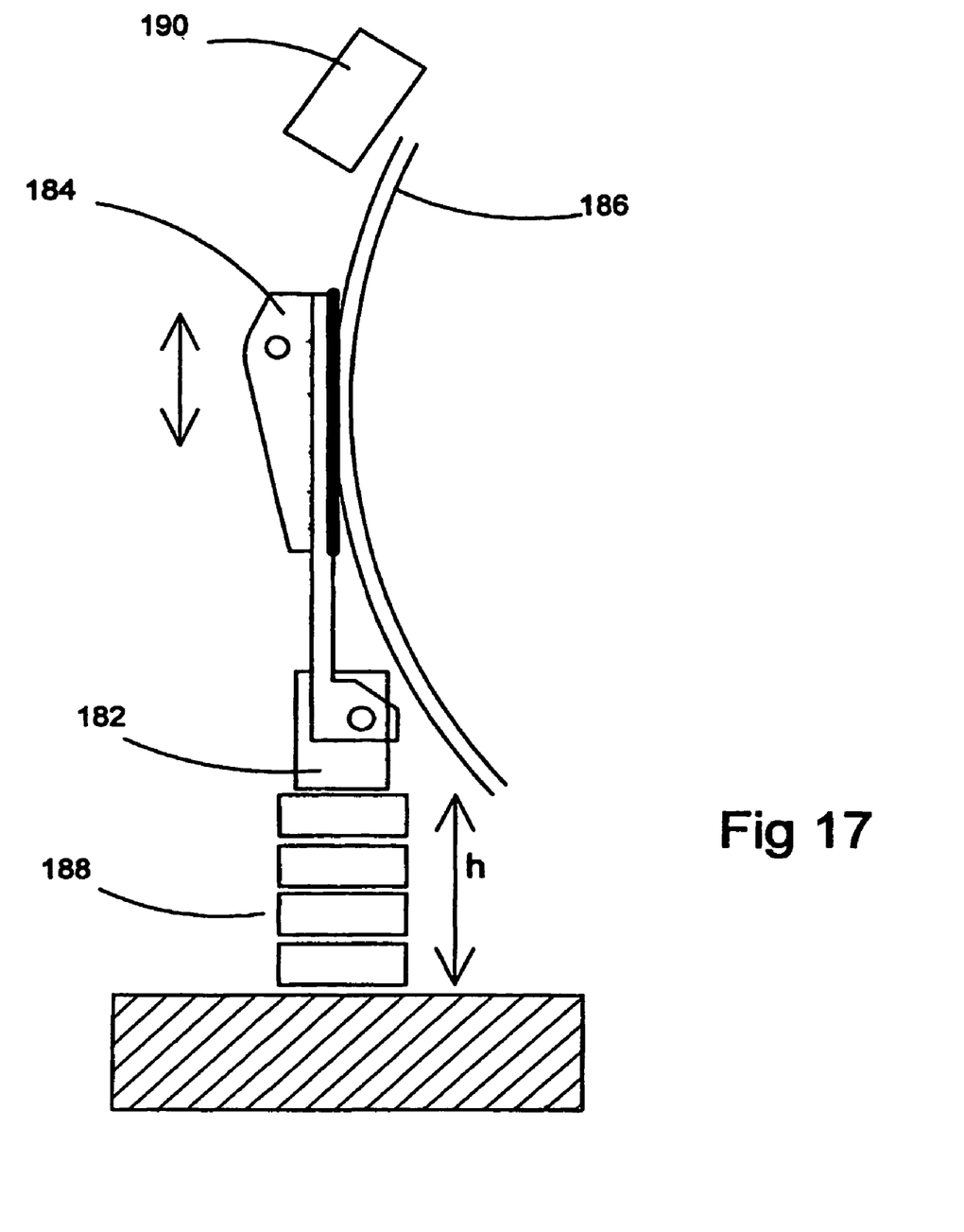
FIG. 17 is a side view of a fifth embodiment of the mechanical brake in its locked position.

In a further embodiment of the brake system, the brake may be used to hold the articulated probe head in a repeatable position. FIG. 17 illustrates the a brake pad 184 pivotally mounted on a mount 182. The mount in turn is mounted on a piezo stack 188. As in previously embodiments, the articulated probe is locked by pressing the brake pad against a rotary part such as the driven wheel 186. The position of the articulated probe head is determined by reading the position from the encoder 190. If the articulated probe head is not in its desired position, this embodiment enables the position to be adjusted. The brake pad 184 remains in contact with the rotary part 186 whilst a voltage is applied to the piezo stack 188 to adjust its height h. This has the effect of moving the position of the brake pad 184 and thereby rotating the driven wheel 186 which is in contact with the brake pad. The position of the driven wheel 186 may therefore be adjusted until the output from the encoders 190 gives the desired position. The piezo stack 188 has the advantage that it does not dissipate much heat. Furthermore it produces a high force with small movements (a few hundred microns) which enables fine adjustment. Other actuators may be used, for example a hydraulic ram.

This mechanical brake is suitable for any type of articulating probe head which has one part rotating relative to another. For example the brake is suitable for the probe head disclosed in U.S. Pat. No. RE35510, in which the articulated probe head moves between a plurality of indexed angular positions.

Where the articulating probe head provides rotation about two or three axes, a mechanical brake may be provided for each axis.

The surface sensing device could comprise for example a surface sensing probe, a stylus or a camera.

Figure 18:
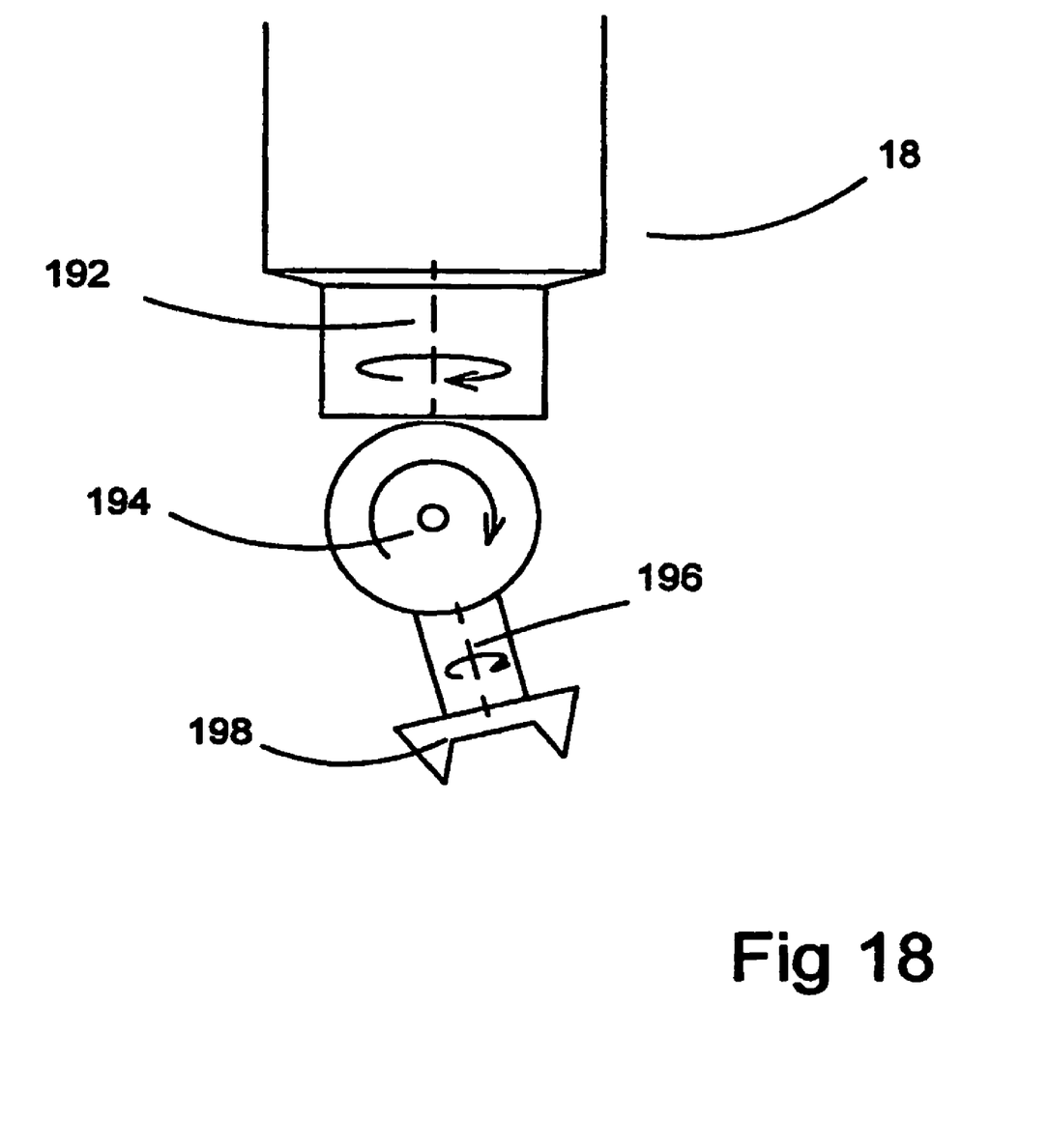
FIG. 18 is a side view of an articulated probe head with three axes of rotation.

FIG. 18 illustrates an articulating probe head 18 onto which a camera 198 is mounted. The camera 198 is rotatable about three axes 192, 194, 196.

Although the above embodiments describe a brake acting against a drive belt or a driven wheel, the brake may act on any rotary part, such as a shaft or motor pinion.

In all of the above embodiments, the mechanical lock uses friction to lock the articulating head. Although in the above embodiments the lock is actuated by a solenoid, other means may be used, such as hydraulic, pneumatic, motor, piezo or gravity. The mechanical lock is actuated into its engaged and disengaged positions but once in position no power is required.

Other types of brake, such as a disc brake may also be used.

It is also possible to have a brake in which there is no contact between the brake member and a rotary part. A magnetic brake may comprise one or more electromagnets in close proximity to a ferrous rotary part. The brake is actuated by turning on the electromagnets which will prevent the rotary part from rotating.

Use of a mechanical lock to lock the axes of the articulating probe head has several advantages over sensing the motors of the articulating probe head to hold it in position. With the use of a mechanical lock, the motors of the articulating probe head are allowed to rest, thus reducing the temperature of the system. The reduced thermal effect improves the metrology of the system. Furthermore, the mechanical lock provides a fixed system, compared to servoing the motors, thus improving the metrology of the system.

In a second embodiment of the invention, the articulated probe head is calibrated by scanning a calibrated artefact.

Figure 8:
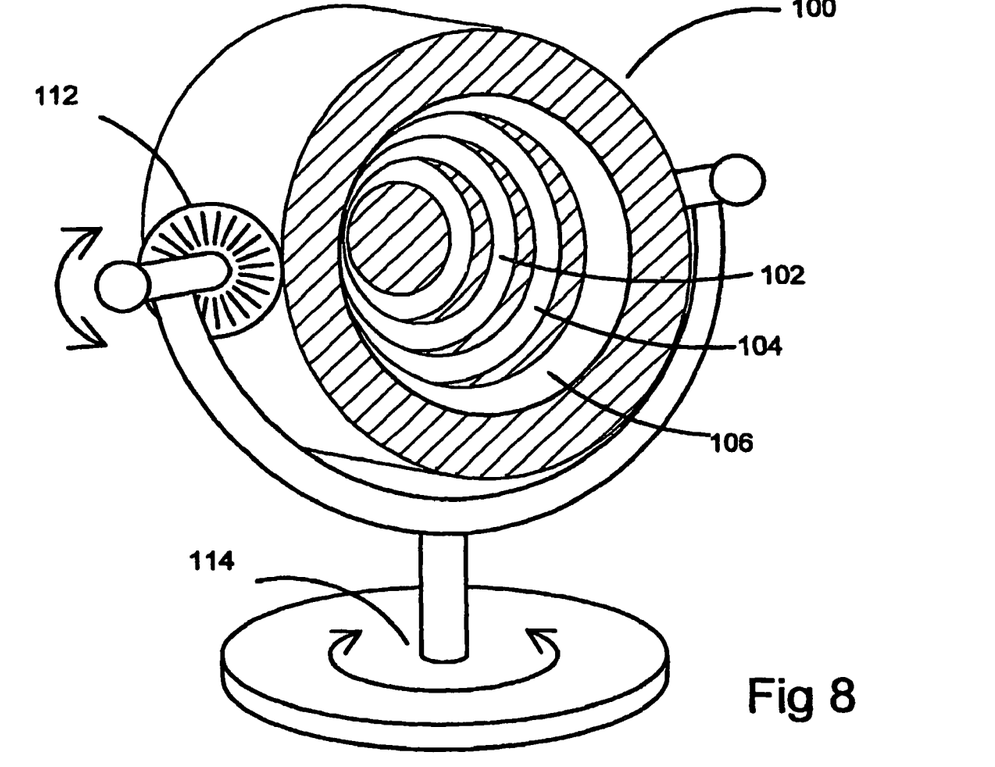
FIG. 8 is a perspective view of a first embodiment of a calibration artefact.
Figure 9:
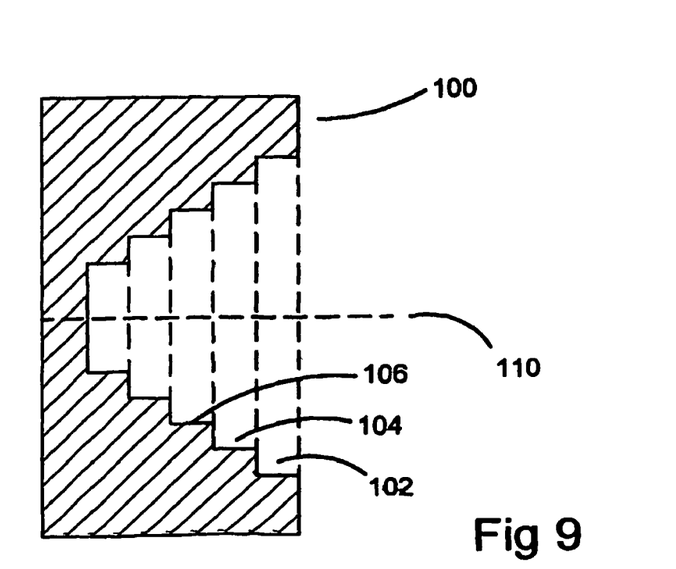
FIG. 9 is a cross-section of the calibration artefact of FIG. 8.

FIG. 8 illustrates an artefact 100 which comprises circular profiles 102,104,106 of different diameters. These circular profiles 102,104,106 are calibrated, for example by form measuring apparatus, and are thus of known dimensions.

The circular profiles have a centre line 110, and this centre line may be oriented with a desired direction, for example, the machine X,Y and Z axes, by means of first and second indexing devices 112,114.

The calibrated artefact 100 is orientated with its centre line 110 aligned with a first axis, for example the machine's X-axis. The machine arm moves the articulating probe head and probe into a position aligned with this axis such that the circular profile may be scanned by the probe by rotation about axes A1 and A2 of the articulated probe head, whilst the machine arm remains stationary.

The circular profiles 102,104,106 are preferably scanned at a fast speed, i.e. the speed to be used for subsequent measurement.

The measurements of the circular profile are compared with the known forms of the circular profiles to create an error map relating to the directions and speed of the measurement. The calibrated artefact 100 is then oriented to align its centre line 110 with a new direction, using the indexing devices, and the method is repeated to create a new error map relating to this new direction.

Once the calibrated artefact 100 has been measured at different orientation, for example 7.5° increments, the data may be interpolated to derive the error data for the positions of the calibrated artefact in between these orientations. Likewise, the data relating to the circular profiles of different diameters may be interpolated to create error data for circular profiles having diameters in between the measured values. The interpolation may comprise techniques such as linear or polynomial best fits.

By measuring the calibrated artefact at a fast speed, the error map corrects for dynamic errors. However as discussed earlier, this may not be necessary if the articulated head has a good mechanical design.

Subsequent workpieces measured using the probe mounted on the articulating probe head are corrected using the error map relating to the relevant direction.

Figure 10:
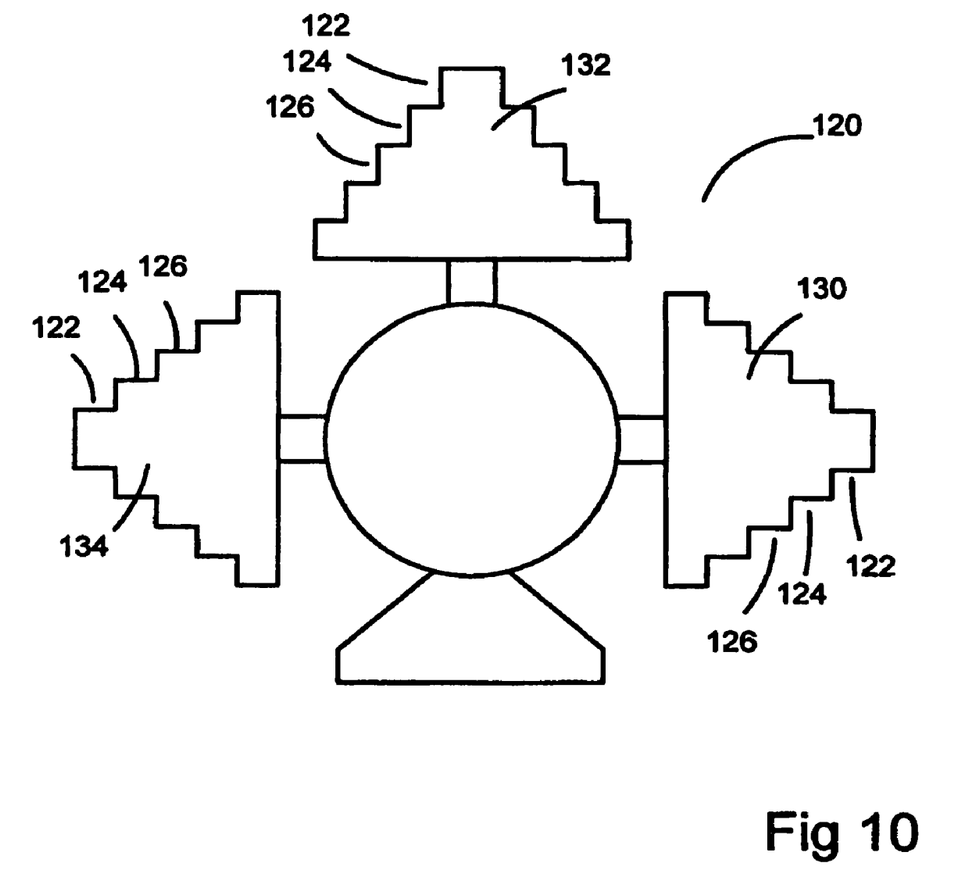
FIG. 10 is a side view of a second embodiment of a calibration artefact.

FIG. 10 shows an alternative type of calibrating artefact 120 in which several cones 130,132,134 are provided with circular profiles 122,124,126 of different diameters which are aligned along different machine axes, thus removing the requirement of an indexing device.

The above description describes an articulated probe head mounted on a CMM. However this invention is suitable for any type of coordinate positioning apparatus that has one or more axis of movement. For example the articulated probe head may be mounted on a single axis system.

The invention claimed is:

1. An articulating probe head comprising a first mount for mounting on a support and a second mount onto which a surface sensing device may be mounted, the second mount being rotatable relative to the first mount about one or more axis, wherein the articulated probe head is provided with at leak one mechanical brake to lock the position of the second mount relative to the first mount about at least one axis and whereby at least one position measuring device is provided to determine the position of the second mount relative to the first mount about said at least one axis in the locked position.

2. An articulating probe head according to claim 1, wherein the articulating probe head includes a rotary member rotatable about at least one axis, and wherein the brake has a lock member which moves between first and second positions, in a first position the lock member engages the rotary member to lock the rotary member in position and in a second position the lock member disengages the rotary member, allowing the rotary member to rotate.

3. An articulating probe head according to claim 2, wherein the rotary member comprises a drive belt.

4. An articulating probe head according to claim 2, wherein the rotary member comprises a driven wheel.

5. An articulating probe head according to claim 2, wherein the rotary member is provided with a toothed profile and wherein the lock member comprises a toothed lock assembly, such that in the first position the teeth of the lock assembly and the rotary member interlock.

6. An articulating probe head according to claim 2, wherein the lock has an actuator to move the lock member between the first and second positions.

7. An articulating probe head according to claim 6, wherein the point of contact between the actuator and the lock member is separated transversely from the point of contact between the lock member and the rotary member.

8. An articulating probe head according to claim 7, wherein the lock member comprises a lever assembly pivotable about a pivot point and wherein the point of contact between the lock member and the rotary member is located between the pivot point and the point of contact between the actuator and the lock member.

9. An articulating probe head according to claim 2, wherein the lock member comprises a lever assembly.

10. An articulating probe head according to claim 2, wherein biasing means is provided to bias the lock member against the rotary member when the lock member is in the first position.

11. An articulating probe head according to claim 1, wherein at least one actuator is provided for fine adjustment of the position of the second mount relative to the first mount about the at least one axis.

12. An articulating probe head according to claim 11, wherein feedback from the position measuring device is used to determine the amount of adjustment required.

13. An articulating probe head according to claim 11, wherein the articulating probe head includes a rotary member rotatable about at least one axis, and wherein the brake has a lock member which moves between first and second positions, in the first position the lock member engages the rotary member to lock the rotary member in position and in the second position the lock member disengages the rotary member, allowing the rotary member to rotate and whereby the at least one actuator acts to change the position of the lock member whilst it is engaged with the rotary member.

14. An articulating probe head according to claim 11, in which the at least one actuator comprises at least one piezo stack.

* * * * *

UNITED STATES PATENT AND TRADEMARK OFFICE
CERTIFICATE OF CORRECTION

Page 1 of 1

PATENT NO. : 8,001,859 B2
APPLICATION NO. : 12/457958
DATED : August 23, 2011
INVENTOR(S) : David Roberts McMurtry et al.

It is certified that error appears in the above-identified patent and that said Letters Patent is hereby corrected as shown below:

Col. 9, lines 8-17, in the Claims, claim 1 should read as follows:

1. An articulating probe head comprising a first mount for mounting on a support and a second mount onto which a surface sensing device may be mounted, the second mount being rotatable relative to the first mount about one or more axis, wherein the articulated probe head is provided with ~~at leak~~ at least one mechanical brake to lock the position of the second mount relative to the first mount about at least one axis and whereby at least one position measuring device is provided to determine the position of the second mount relative to the first mount about said at least one axis in the locked position.

Signed and Sealed this
Twenty-fifth Day of October, 2011

David J. Kappos
*Director of the United States Patent and Trademark Office*